United States Patent

[11] 3,571,875

| [72] | Inventors | Gianfranco Grandi;<br>Herbert Loos, Munich, Germany |
|---|---|---|
| [21] | Appl. No. | 714,925 |
| [22] | Filed | Mar. 21, 1968 |
| [45] | Patented | Mar. 23, 1971 |
| [73] | Assignee | Carl Hurth Maschinen-Und Zahnradfabrik<br>Munich, Postfach, Germany |
| [32] | Priority | Mar. 23, 1967 |
| [33] | | Germany |
| [31] | | H62239 |

[54] WORK TOOL FOR PRECISION WORKING OF GEARS
7 Claims, 3 Drawing Figs.

[52] U.S. Cl. ................................................. 29/105
[51] Int. Cl. ................................................. B26d 1/12
[50] Field of Search ................................. 29/95, 95.1,
96, 103, 103.2, 105, 105.1; 90/1.65 (Cursory);
9/1.65

[56] References Cited
UNITED STATES PATENTS

| 1,867,161 | 7/1932 | Leahy | 29/105 |
| 2,167,146 | 7/1939 | Drader et al. | 29/96 |
| 2,407,921 | 9/1946 | Deliso | 29/95.1 |
| 2,408,787 | 10/1946 | Lowell | 29/105 |
| 2,298,471 | 10/1942 | Drummond | 29/103 |
| 2,682,100 | 6/1954 | Pelphrey | 29/105 |

*Primary Examiner*—Harrison L. Hinson
*Attorney*—Woodhams, Blanchard and Flynn

ABSTRACT: A spur or helical gearlike or racklike work tool for precision working of gears wherein the work tool has a plurality of cutter teeth adjustably and removably securable to a base member so that the cutter teeth can be exchanged and adjusted.

PATENTED MAR 23 1971 3,571,875
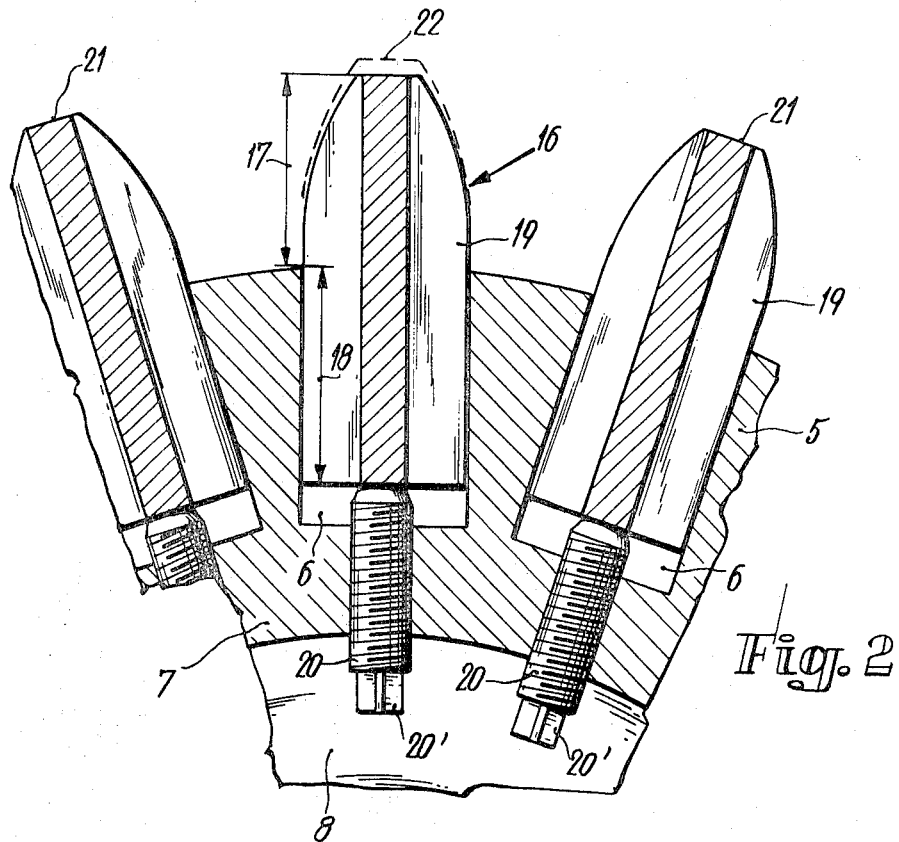
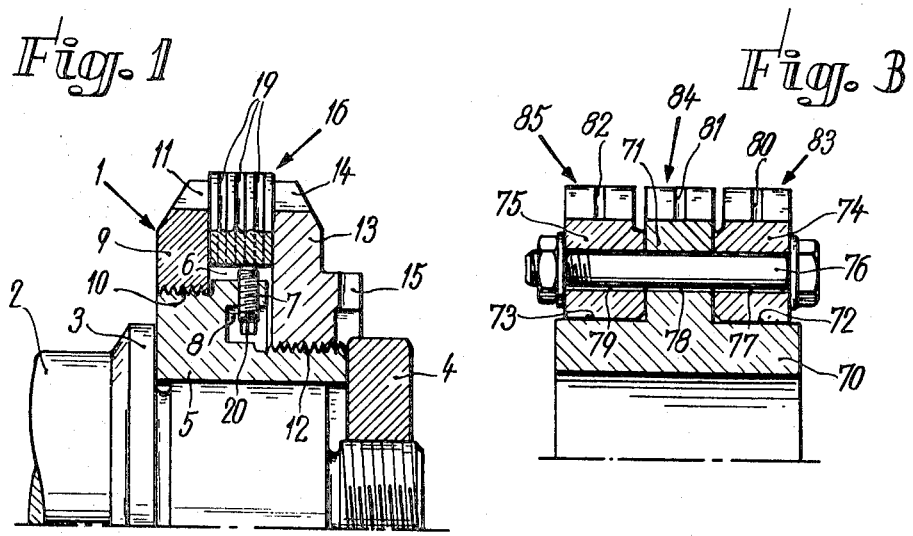
Inventors:
Herbert Loos and
Gianfranco Grandi
by
Woodhams, Blanchard & Flynn
Attorneys

WORK TOOL FOR PRECISION WORKING OF GEARS

FIELD OF THE INVENTION

This invention relates to a spur or helical gearlike or racklike work tool for precision working, in particular, for shaving of gears.

BACKGROUND OF THE INVENTION

The purpose of precision working of the work tool, such as by honing or burnishing, is to improve the surface of the workpiece. In gear shaving operations, the work tool teeth are provided with a plurality of grooves and ribs extending from the addendum circle to the dedendum circle, said grooves and ribs constituting the cutting edges for removing shavings. The shaving gear and the workpiece cut at transverse axes so that a longitudinal sliding action is produced and causes the cutting edges to shave the teeth on the workpiece. Shaving tools exist which have teeth which are not provided with grooves, the cutting edges of which are formed by the sides of the gear.

Commonly known tools which are being used at present are of a one-piece construction. These have the disadvantage that the teeth become thinner as the number of sharpenings increase until they are finally all used up.

Practice has shown that a satisfactory shaving result, namely a tooth surface with little or no profile errors, can only be obtained if the the addendum modification and the outer diameter of the shaving gear have a certain relation to the workpiece teeth (compare German Pat. No. 970,027, British Pat. No. 837,461/817,462 and U.S. Pat. No. 3,180,227).

DUring the finishing operation of sharpening the cutting edges on the gear surfaces of the shaving wheel, the addendum modification changes which either requires a refinishing of the shaving-wheel tooth addendum or, if this is not done or is not possible because otherwise, for example, the shaving gear will not project far enough into the workpiece tooth gap, the profile errors become larger.

It is the purpose of this invention to avoid the described deficiencies, namely to make it possible to change the tooth thickness or addendum modification during a sharpening thereof to keep the thickness of the tooth in a predetermined condition.

To attain said purpose, the invention provides a work tool which comprises a base member into which cutter teeth having the cutting grooves are received. Thus, it is possible to adjust the cutter teeth according to a change in tooth thickness so that a decrease in tooth thickness due to a sharpening thereof can be balanced or offset. Thus, the life of the work tool is substantially increased.

Several possible constructions can be used to carry out the inventive concept. In one embodiment, the cutter teeth are arranged radially adjustably in the base member. According to a modified embodiment of the invention, the cutter teeth are arranged circumferentially on the base member and adjustable in a peripheral direction.

The work tool of the last embodiment is comprised of two axially spaced rings having cutter teeth on the outer periphery thereof and which are adjustable relative to each other in a peripheral direction so that the thickness of the cutter teeth is adjustable. This construction results in a very sturdy easily adjustable and reliable arrangement for the cutter teeth.

In the embodiment having cutter-toothed rings which are adjustable in a peripheral direction, the one toothed ring or rings is adjusted at one side and the other toothed ring or rings is adjusted at the other side. Thus, each toothed ring is at first only located on one side of any given tooth (left or right side of the tooth). After a certain time the rings can be adjusted to the other side of such tooth so that the toothed ring which before for example treated the right workpiece surfaces now treats the left surfaces. This results also in an increased life of the work tool.

If the work tool is used for shaving of gears, it is then advantageous not only to cut with the front or leading edges of the teeth but to provide the surfaces of the teeth with grooves, the walls together with said surfaces of which form cutting edges. The walls of the grooves can thereby form a cutting angle with the tooth surface which cutting angle may be smaller than or larger than or equal to 90°. The grooves may also be positioned in the cutting plane (the plane positioned perpendicular to the axis) or inclined thereto.

Further characteristics and advantages of the invention will be disclosed in the description hereinbelow.

The invention is illustrated and described by the embodiments of FIGS. 1 to 3.

FIG. 1 illustrates a longitudinal cross section of one-half of a work tool, in this case a shaving gear embodying the invention.

FIG. 2 is a partial cross-sectional view of the shaving gear of FIG. 1.

FIG. 3 illustrates longitudinal cross section of a modified embodiment of the invention.

FIGS. 1 and 2 illustrate an embodiment of the invention. FIG. 1 is a cross-sectional view of one-half of a shaving gear 1, which is mounted on a work tool spindle 2. The shaving gear is secured against rotation relative to the work tool spindle by means not shown. The shaving gear is axially secured between a shoulder 3 on the spindle 2 and a nut 4. The shaving gear and the work tool spindle are arranged in a known gear-shaving machine in which gears are precision made by having the axes of the workpiece and the work tool transverse with respect to each other. The shaving gear 1 of the invention will work satisfactorily with any shaving machine and, for this reason, the shaving machine is not illustrated or described.

The shaving gear 1 (FIGS. 1 and 2) comprises an annular base member 5 which has a plurality of radial slots 6 at its periphery leaving a web portion 7 standing. An annular groove 8 is provided radially inwardly of the slots 6 in the base member. A front ring 9 is fixed to the front side of the base 5 by a thread 10 and/or by brazing or welding or by any other suitable means. The base member 5 and the front ring 9 can also be of a one-piece construction. The ring 9 comprises teeth 11 to support the cutter teeth 16 which will be described later. The base member 5 is provided with a second thread 12 onto which a nut 13 is threadedly engaged. The nut 13 is also provided with teeth 14. Moreover, a plurality of slots 15 are provided to receive a wrench for tightening the nut onto the base 5. Securement of the teeth 16 by means of elements 9 and 13 are illustrated only as an example. The elements 9 and 13 can be ring elements which are connected the base member 5 by screws (similar to FIG. 3) to thereby clamp the teeth 16.

The cutter teeth 16, above-mentioned, are inserted into the slots 6 and comprise a shaft portion 17 arranged within the slots 6 and an operating portion 18 radially projecting from the base member 5. The cutter teeth 16 are provided in a known manner with a plurality of cutting grooves to define cutting edges 19. The cutting teeth 16 are radially supported by set screws 20 and are clamped between the ring 9 and the nut 13.

The cutter teeth can be adjusted radially to a desired outer diameter 21 and can be cut to a desired addendum modification. If the teeth are of the blunt type, they can be moved slightly radially outwardly by means of the set screws 20 with the aid of a wrench on the heads 20' thereof. The adjusted position is indicated by the dotted lines 22 (FIG. 2). The teeth can then be finalized by a fine grinding process, for example, to their desired shape. Thus, the teeth can be maintained at an exact and predetermined addendum setting which corresponds to the optimum contact conditions.

A further embodiment is illustrated in FIG. 3. The base member 70 is of a one-piece construction together having an annular rib 71 with cutter teeth 84 on the outer periphery thereof and has cylindrical surfaces 72 and 73 on both sides of the toothed rib. Rings 74 and 75 having cutter teeth 83 and 85, respectively, on the outer periphery thereof are recieved on the surfaces 72 and 73. The cutter toothed rings are secured to the rib 71 by bolts 76 which extend through holes 77, 78 and 79. The holes 77, 78 and 79 are larger in diameter than the bolt 76 so that a peripheral adjustment of the toothed rings is possible. In this embodiment, the teeth 83, 84 and 85 are provided with one groove 80, 81 and 82, respectively, on the right and left surfaces thereof the walls of said grooves and the teeth surfaces forming cutting edges. The cutter-toothed rings 74 and 75 are in one peripheral direction and the toothed rib 71 is adjusted in the other direction. Thus, for the tooth assembly 83, 84 and 85, a tooth thickness can be freely regulated by the limits of the holes 77, 78 and 79. The teeth of each ring and rib only need to have a cutting groove on one side since only one surface of the tooth cuts at one time. However, since the cutting grooves are arranged on both sides of the tooth, the shaving gear will double its lifetime because the right and the left surface can be selectively used for a cutting operation.

We claim:

1. A toothed tool for gear finishing, in particular for gear shaving, comprising:
    a base member having a pair of axially spaced disc members mounted thereon;
    means on said pair of discs and said base member for permitting relative axial movement therebetween;
    a plurality of radial slots in said base member, said radial slots opening radially outwardly of said base member;
    a plurality of teeth slidably mounted in said radial slots and projecting radially outwardly from said base member; and
    means on said base member for supporting said plurality of teeth for adjustable movement radially of said base member whereby said plurality of teeth, after said adjustable movement radially of said base member, may be maintained in an adjusted position by moving at least one of said disc members on said base member axially toward the other of said disc members to clamp said plurality of teeth therebetween.

2. A toothed tool for gear finishing, comprising:
    a base member;
    a plurality of radial slots in said base member opening radially outwardly thereof;
    a plurality of teeth slidably mounted in said radial slot and projecting radially outwardly from said base member, said plurality of teeth each being provided with grooves extending from the tooth addendum to the tooth dedendum;
    means on said base member for supporting said plurality of teeth for adjustable movement radially of said base member; and
    clamping means adapted to move axially of said base member for clamping said plurality of teeth therebetween.

3. A toothed tool according to claim 2, wherein said supporting means comprises a plurality of set screws radially aligned with said plurality of teeth for adjusting the radial projecting of said teeth from said base member.

4. A toothed tool according to claim 2, in particular for gear shaving wherein the walls of the grooves and the tooth flanks define cutting edges.

5. A toothed tool according to claim 2 wherein said clamping means is further adapted to simultaneously engage each of the teeth to clamp same in a fixed position on said base member.

6. A toothed tool according to claim 1, wherein the tooth flanks of said plurality of teeth are provided with grooves extending from the tooth addendum to the tooth dedendum, the walls of said grooves forming cutting edges with the tooth flanks.

7. A toothed tool according o claim 1, wherein said supporting means comprises a plurality of set screws radially aligned with said plurality of teeth for adjusting the radial projection of said teeth from said base member.